C. L. BURTON.
FERTILIZER DISTRIBUTER.
APPLICATION FILED FEB. 6, 1911.
1,120,021.
Patented Dec. 8, 1914.
4 SHEETS—SHEET 1.
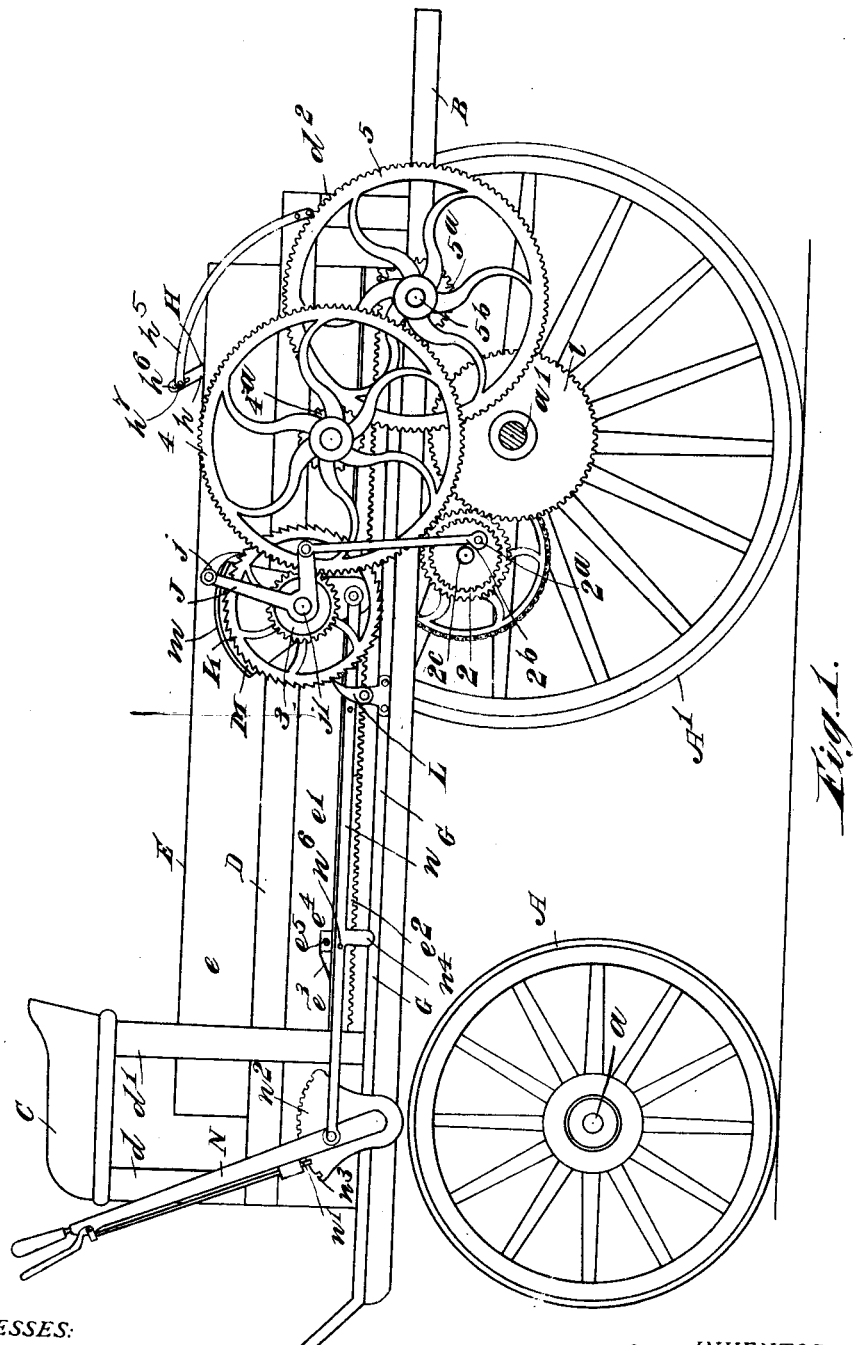
WITNESSES:
Sudger A. Nicol.
Grace Crowley.
INVENTOR.
Charlie L. Burton
BY Albert M. Moore,
his ATTORNEY.

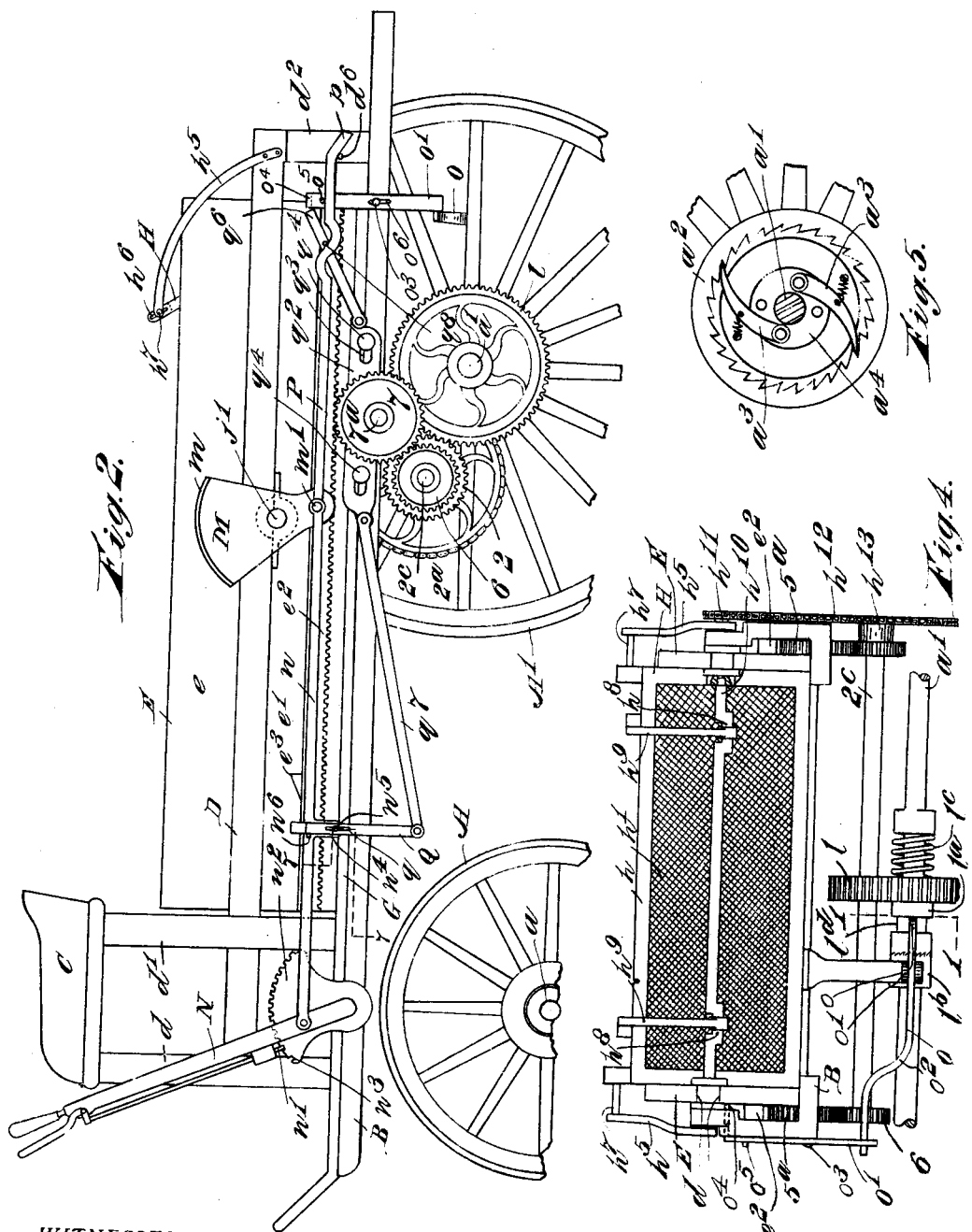

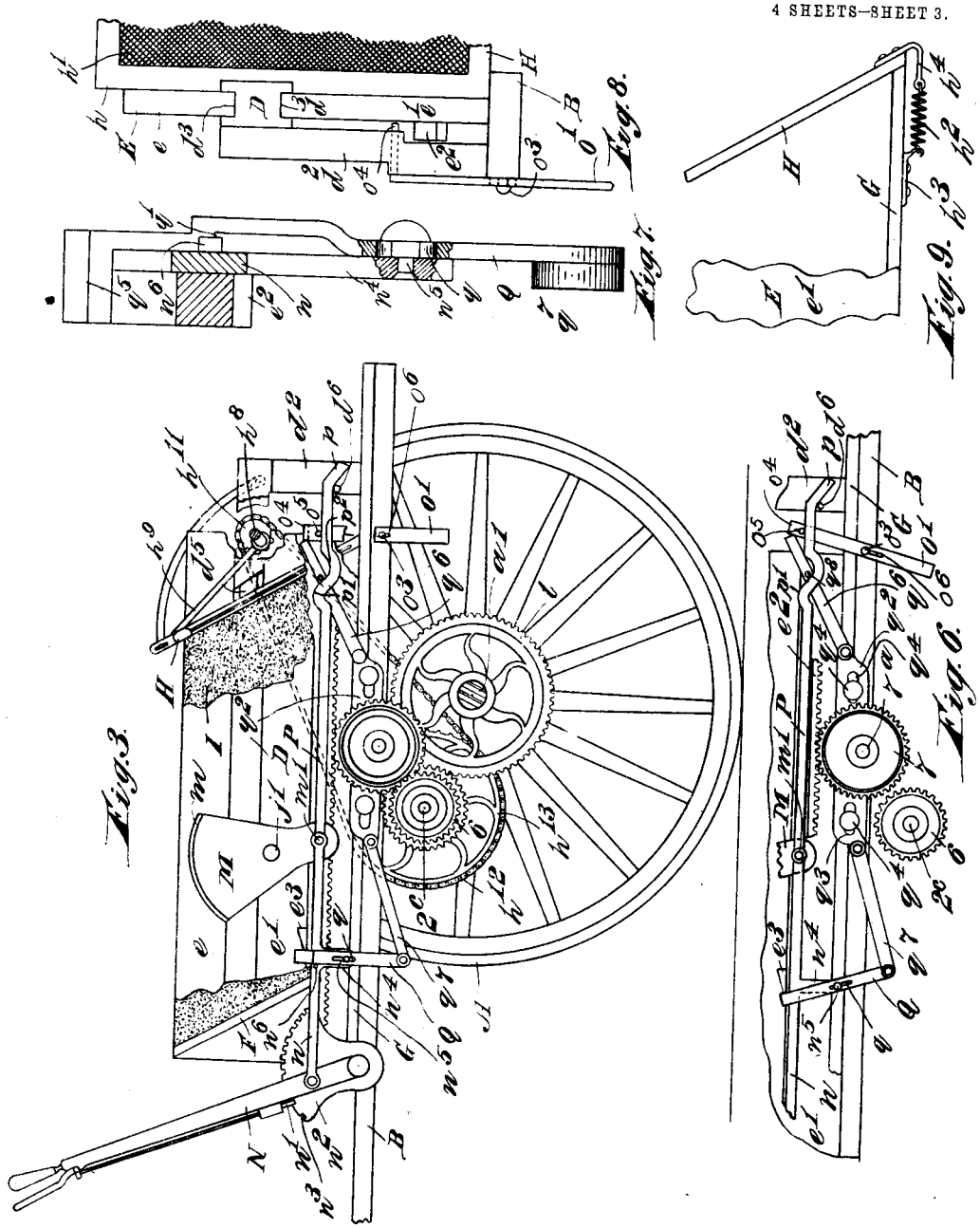

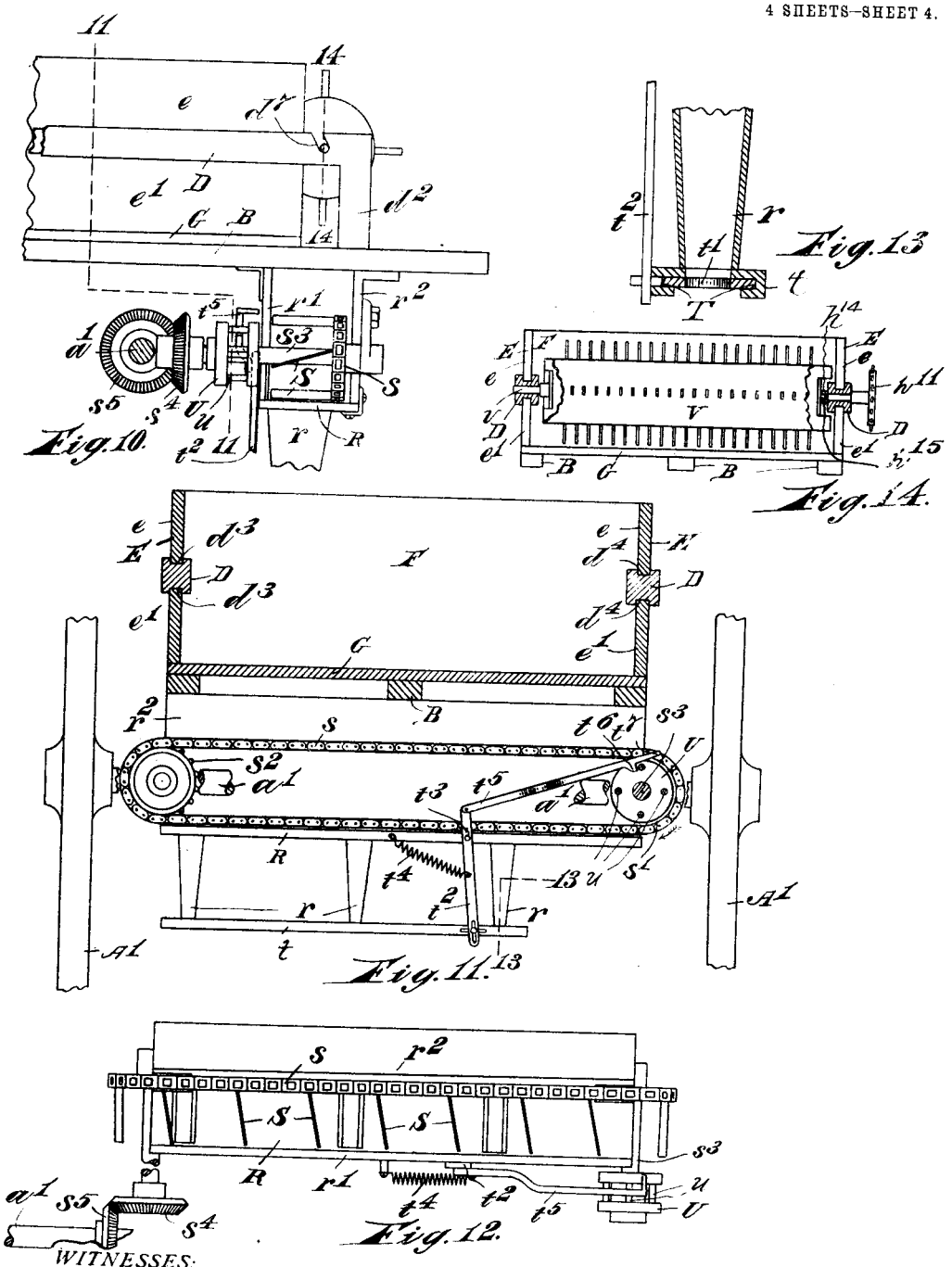

UNITED STATES PATENT OFFICE.

CHARLIE L. BURTON, OF BILLERICA, MASSACHUSETTS.

FERTILIZER-DISTRIBUTER.

1,120,021. Specification of Letters Patent. Patented Dec. 8, 1914.

Application filed February 6, 1911. Serial No. 606,680.

*To all whom it may concern:*

Be it known that I, CHARLIE L. BURTON, a citizen of the United States, residing at Billerica, in the county of Middlesex and Commonwealth of Massachusetts, have invented a certain new and useful Improvement in Fertilizer-Distributers, of which the following is a specification.

This invention relates to fertilizer distributers or apparatus for carrying and distributing manufactured or commercial fertilizers or stable-manure.

The principal objects of the invention are to regulate accurately the feeding of the fertilizer to the distributing mechanism; to stop the feed automatically when the supply of fertilizer is exhausted; to provide means whereby a stone or other large foreign body may be discharged without injury to the machine; to secure uniformity of delivery of the fertilizer by reducing lumps or cakes of the same to uniform size; to stop or vary the speed of the feeding or distributing devices without stopping the carriage.

In the accompanying drawing on four sheets, Figure 1 is a side elevation of a fertilizer distributer containing my improvement, the rear axle being in vertical section on the line 1 1 in Fig. 4; Fig. 2, a similar view showing some parts omitted from Fig. 1 for clearness of representation and omitting some parts shown in Fig. 1; Fig. 3, similar to Fig. 2 showing the invention applied to a two-wheeled carriage; Fig. 4, a rear elevation showing the screen, rear axle and parts of the feed-stopping-and-reversing means; Fig. 5, a side elevation of the means which connect the driving wheel with the driving axle; Fig. 6, a side elevation of part of the feeding-stopping and reversing mechanism; Fig. 7, a vertical section on the line 7 7 in Fig. 2; Fig. 8, a rear elevation of a part of the screen at the left, with adjacent parts of the body and frame of the carriage in which the fertilizer is conveyed; Fig. 9, a side elevation of the screen and the means which normally hold said screen in contact with the rear of the floor of the carriage; Fig. 10, a side elevation of the rear portion of the body of the carriage and the means which distribute the fertilizer after the same passes through the screen, a distributing roll replacing the screen; Fig. 11, a transverse section on the line 11 11 in Fig. 10, omitting the front of the casing of the distributing devices; Fig. 12, a plan of the distributing devices; Fig. 13, an enlarged section on the line 13 13 in Fig. 11 of one of the distributing spouts; Fig. 14, a rear elevation of the spiked distributing roll, the frame being in section on the line 14 14 in Fig. 10.

The fertilizer-distributer herein described is provided with wheels A A¹ (two or four); sills B; axles $a$ $a^1$, the wheels A¹ being connected to the rear axle or driving axle $a^1$ by the well-known pawl-ratchet connection shown in Fig. 5 in which $a^2$ represents an internally-toothed ratchet rigidly secured to the rear wheel, and $a^3$ pawls carried by a collar or flange $a^4$ rigidly secured to the axle $a^1$ in such a manner that only a forward movement of the wheel revolves the axle.

The body of the machine is substantially like a farm-wagon or cart in appearance and has a driver's seat C supported upon posts $d$ $d^1$ which form a part of the frame of the carriage, said frame having horizontal rails D and other posts $d^2$ at the rear supported on the sill B.

The sides E are longitudinally movable and are each formed in an upper part $e$ and a lower part $e^1$ which parts are guided in grooves $d^3$ $d^4$ (Fig. 8). All the parts above named are alike at both sides of the machine and, except as stated in regard to the sides and grooves $d^3$ $d^4$ are of ordinary construction.

The sides E near their front ends are rigidly connected by the inclined front F of the machine which reaches from the top to the bottom of said sides; said sides and front resting on the floor G of the carriage, which floor is immovable with respect to the frame. The space inclosed by the sides E, front F and a screen H arranged parallel with said front, receives upon the floor G the fertilizer I to be distributed and these parts serve as a cart-body or wagon-body, in which said fertilizer is carried to the field.

When the machine operates to distribute, the sides and front are caused to move backward, the front F approaching the screen and the screen is given a reciprocating movement in its own plane to sift the fertilizer which is maintained at a constant height by the approach of said front F toward said screen H.

All the automatically moving parts of the machine are driven from the main or driving axle $a^1$ by means described below, so that the front axle $a$ in Figs. 1 and 2, is merely a supporting axle for a larger machine and may be dispensed with in the smaller machine shown in Fig. 3.

The axle $a^1$ has normally rotary therewith a spur-gear 1 which engages a spur-pinion 2 and a wrist-pin $2^a$ traveling with the latter is connected by a rod $2^b$ to one arm of a bell-crank shaped pawl-lever J the other arm of which carries a pawl $j$ which engages a ratchet K concentric with the fulcrum $j^1$ of said pawl-lever and turns said ratchet K forward at each revolution of said pinion 2, a retaining pawl L fulcrumed on a sill B or on the side of the floor G preventing any return movement of said ratchet. A pinion 3 concentric with and rotary with the ratchet engages a spur-gear 4 and a spur-pinion $4^a$ concentrically secured to the gear 4 engages the gear 5, a spur-pinion $5^a$, concentric with said gear 5 engaging a horizontal rack-bar $e^2$ which extends the whole length of a side E of the machine and rigidly secured to said side, there being a rack-bar $e^2$ and pinion $5^a$ at each side of the machine, the duplicate pinions $5^a$ being fast on the same shaft $5^b$ which extends across the machine below the floor G. When the machine is drawn forward, the sides E and front F are thus normally intermittently carried rearward by movement of the ratchet K and pawl-lever J, the amount of each such movement being varied by the position of a shield M, pivoted concentrically with said ratchet and having a concentric arc-shaped ledge $m$ which may be set to hold the pawl $j$ out of engagement with said ratchet during the whole or any lesser part of the sweep of said pawl-lever, so that the amount of fertilizer distributed in a given distance traveled over by the machine may be accurately regulated, because the movements of the screen H hereinafter described are uniform in extent and depend for their frequency on the speed of rotation of the driving axle $a^1$.

The position of the shield M is determined by the position of the controlling-lever N arranged within convenient reach of the driver's seat C, said lever being connected by a rod $n$ to said shield below the pivot $j^1$ and being retained in any position by a latch $n^1$ which engages a notched arc-shaped holding-plate $n^2$ of well-known construction.

The screen H is a rectangular frame $h$ covered with any suitable reticulated or foraminous material $h^1$ arranged transversely of the body and filling the space between the sides E and extending above said sides and below the rear end of the floor G (Figs. 3, 4, 8 and 9) and normally parallel with the front F. Said screen has a sliding fit in inclined grooves $d^5$ in the rails D (Fig. 3) and said grooves are wide enough from front to rear to allow the lower end of said screen to swing away from the rear end of the floor G, when a hard foreign substance is pressed against the front of said screen, far enough to allow said substance to drop between the rear end of said floor and said screen, said screen being normally held against said rear end by suitable yielding means as by the contraction of a spiral spring $h^2$ connected to pieces $h^3$ $h^4$ rigidly secured to said floor and screen (Fig. 9). The upper ends of the sides of the screen frame $h$ are pivotally and slidably supported on braces $h^5$ rigidly secured to the frame of the machine, said upper ends having slots $h^6$ with horizontal studs $h^7$ which project inward from said braces.

The screen is reciprocated by means of cranks $h^8$ $h^8$, pitmen $h^9$ $h^9$ connecting said cranks to the upper part of the frame $h$, a shaft $h^{10}$ which carries said cranks, a sprocket-wheel $h^{11}$ rotary with said shaft, a sprocket-chain $h^{12}$ connecting said wheel $h^{11}$ to another sprocket-wheel $h^{13}$ fast on the same shaft $2^c$ with the pinion 2, above described, and the spur-gear 1 on the axle $a^1$. The spur-gear 1 is not fast on the axle $a^1$ but is one counterpart of a clutch (Fig. 4), its hub $1^a$ having projections and recesses which engage corresponding recesses and projections on the other clutch counterpart $1^b$ which is fast on said axle. A spiral spring $1^c$ surrounding said axle normally crowds the gear 1 toward the counterpart $1^b$ and closes said clutch, a clutch-lever O, which serves to open said clutch being fulcrumed on a stud $o$ secured to the underside of the floor G and having an inner bent arm $o^1$ which engages a groove $1^d$ in the hub $1^a$ and an outer arm $o^2$ which extends transversely beyond the body of the machine on the side which carries the controlling lever N. Another lever $O^1$ is pivoted between its ends at $o^3$ on the sill B at the same side of the machine and reaches down behind the free end portion of the arm $o^2$. A wedge-shaped projection $e^3$ secured on the lower part $e^1$ of the adjacent side strikes the bent upper arm $o^4$ of the lever $O^1$ and throws its lower end forward turning the lever O and opening the clutch when the front comes close to the screen, thus stopping the feeding and screening devices which remain at rest until said wedge $e^3$ is disengaged from said lever $O^1$. A lifting-rod P is pivoted at its front end on the stud $m^1$ and extends horizontally backward beyond the post $d^2$, the rear end portion of said rod being inclined downward at $p$ and resting on a stud $d^6$ in such a manner that drawing said lifting-rod forward sufficiently raises said rear end and lifts said lever $O^1$ (by means of a stud $o^5$ which projects from said lever and rests on said lifting-rod) until the bent end $o^4$ of said lever is above said wedge $e^3$ allowing said lever to be restored to normal position by the action of the clutch-closing spring $1^c$, the opening $o^6$ through which the pivot or fulcrum $o^3$ projects being a longitudinal slot, to permit the longitudinal movement of said lever $O^1$. The lifting of the lever $O^1$ takes place only when the upper end of the controlling lever N is drawn forward until the latch $n^1$ is in the front notch $n^3$ of the holding plate and the shield M prevents any engagement of the pawl $j$ with the ratchet K.

A hanger $n^4$ is carried by the connecting-rod $n$ and supports a lever Q (see Figs. 1–4, 6 and 7) having between its ends a fulcrum slot $q$ which receives a fulcrum stud $n^5$ on said hanger and permits a longitudinal movement of said lever on said stud. A stop-projection $n^6$ on the rod $n$ normally prevents the upper end of the lever Q from swinging forward until said lever is raised sufficiently to bring the top of a recess $q^1$ or offset portion of said lever above said stop, so that when said lever is down on its fulcrum $n^5$ and its upper arm is behind the stop $n^6$ (Figs. 2, 3 and 7) the forward movement of the lever N which opens the clutch and stops the feeding and screening devices, as above described, carries said lever forward without turning and draws a slide $q^2$, the front end of which is connected by a link $q^7$ to the lower end of said lever Q and causes a spur-gear 7, which turns on a horizontal stud $7^a$ rigidly secured to said slide and is always in engagement with the rack at the same side of the machine to engage a pinion 6 rigidly secured on the shaft $2^c$, thereby rotating said gear 7 in a direction to move the corresponding rack forward and causing the pinion $5^a$ and shaft $5^b$ to turn backward so that both racks and sides move forward together.

The slide $q^2$ is supported and guided horizontally by longitudinal slots $q^3$ in said slide and by studs $q^4$ which pass horizontally through said slots into a sill B.

Just before the front F and sides E reach their extreme forward position the wedge $e^3$ reaches under the backwardly bent upper end $q^5$ of the lever Q and lifts said lever clear of the stop $n^6$ and pushes the upper arm of said lever forward forcing the slide $q^2$ backward and disengaging the pinion 7 from the pinion 6, allowing the sides E and front F to come to rest and at the same time opening the clutch by means of a push-rod $q^6$ jointed at its front end to the rear end of the slide $q^2$ the rear of said push-rod striking the backwardly projecting upper end $o^4$ of the lever $O^1$ and opens the clutch by swinging said upper end backward, as above described. The clutch then remains open until the lever $O^1$ is raised by drawing the lifting rod forward until the end $o^4$ is above the rear end of the push-rod, allowing the body of the machine to be filled and drawn to the field to be fertilized while the feeding and screening devices remain at rest, the screen when at rest, owing partly to its inclined position retaining the fertilizer in place.

The upper surface of the lifting-rod P is provided with a reverse or double curve, the front portion $p^1$ of which is convex and the rear portion $p^2$ of which is concave (Figs. 2, 3 and 6) and a stud $q^8$ projecting horizontally from the push-rod $q^6$ rests on said curve in such a manner that when the rear portion of said lifting-rod is raised by being drawn forward, said push-rod is allowed to fall slightly below the bent upper end of said lever $O^1$ at the same time that said lever $O^1$ is raised by throwing the controlling-lever N forward to open the clutch on the driving axle, as above described, and so that when said lifting-rod is thrown backward said push-rod is raised so that said push-rod does not interfere with the lever $O^1$ and the operation of said clutch except when the lever Q is turned and raised by the wedge $e^3$.

When the screen is reciprocated in its own plane, the finely divided fertilizer is sifted through the screen and falls on a collecting board R (Figs. 10–12) provided with spouts $r$ through which the fertilizer may fall to the ground and be deposited in rows or drills, said collecting board being swept by clearers or wings S which extend laterally from a sprocket-chain $s$ or equivalent device which connects the sprocket wheels $s^1$ $s^2$, one of which is fast on a shaft $s^3$ to which is secured a bevel gear $s^4$ which engages another bevel-gear $s^5$ fast on the driving axle $a^1$.

Provision is also made for depositing the fertilizer in hills (Figs. 10–13). A slide T is arranged to move horizontally in ways $t$ secured to the spouts $r$ and is provided with openings $t^1$ which are arranged at the same intervals as said spouts $r$. Said slide T is reciprocated in the direction of its length by a lever $t^2$ fulcrumed at $t^3$ on the edge of the collecting board and alternately drawn in one direction by the contraction of a spring $t^4$ and pushed in the other direction by a pawl $t^5$ pivoted to the upper end of said lever $t^2$ and engaging the rundles $u$ of a lantern-wheel U fast on the shaft $s^3$, the free end $t^7$ of the pawl $t^5$ extending laterally over a head of the wheel U far enough to be lifted by the rundle $u$ next beyond the one engaged by said tooth. By this means the openings $t^1$ of the slide are alternately brought into and out of coincidence with the spouts and the fertilizer is deposited at intervals determined by the angular distance from each other of the rundles $u$ of the lantern-wheel.

The collecting-board R is detachably supported on the front board $r^1$ and back board $r^2$ secured in a vertical position to the sills of the machine. By removing said collecting board with the spouts $r$, slide T, lever $t^2$ and pawl $t^5$ all of which are connected to said board, the fertilizer will fall from the screen between said front board and back board and be spread broadcast.

The sprocket-wheel $h^{11}$ is provided with a hub $h^{14}$ having a square or many-sided socket $h^{15}$, arranged at the inner side of the adjacent frame-rail D and adapted to engage and fit the correspondingly shaped end of the shaft $h^{10}$ so that said shaft and socket must rotate together, and the corresponding frame-rail at the other side of the machine is provided with an inclined bearing-slit $d^7$ which receives the other end of said shaft $h^{10}$. This construction allows the shaft $h^{10}$ to be removed with the pitmen $h^9$ $h^9$ and the screen H and the similarly constructed shaft $v$ of the spike roll V shown in Fig. 14 to take the place of the shaft $h^{10}$ and to be rotated in a similar manner, this spiked roll being of the usual construction and adapted to discharge stable manure carried by the machine in a well known manner without other alteration of the machine than placing a removable projection in the rear of the wedge $e^3$ to turn the lever $O^1$ and stop the backward movement of the front F before the latter comes within reach of the spikes $v$ of the roll V. Such a projection is represented in Fig. 1 as a block $e^4$ placed against the rear of the wedge and retained on the side-part $e^1$ by a screw $e^5$.

The fertilizer being first placed in the body of the machine, the machine is drawn to the field where the fertilizer is to be distributed. The lever N is then drawn backward drawing the shield M forward and allowing the pawl $j$ to engage the ratchet and close the clutch $l^a$ $l^b$, the front of the machine moves backward crowding the fertilizer against the screen H which reciprocates, sifting the fertilizer onto the collecting board R from which said fertilizer is swept into the spouts $r$ by the clearer S and from said spouts is deposited in rows or drills or if desired into hills by the action of the reciprocating slide, or by removing said collecting board R the fertilizer may be sown broadcast. When the front F has gone back as far as possible without striking the screen the back of the wedge $e^3$ forces the upper end of the lever $O^1$ backward and causes the lever O to open the clutch $l^a$ $l^b$, thus stopping the operation of the machine: the lever N is then thrown forward by hand to the front notch $n^3$ of the holding plate $n^2$ closing said clutch and pulling the gear 7 (always in engagement with the rack) horizontally forward into engagement with pinion 6, fast on the shaft $2^c$ and in engagement with the gear 1, loose on the axle $a^1$, so that a subsequent forward movement of the machine causes the rotation of said gear 7 and carries the front F forward until the wedge $e^3$ strikes the lever Q, and opens said clutch as above described, when the machine is in readiness to receive a new load.

I claim as my invention:—

1. In a fertilizer distributer, the combination of a frame, a front movable with respect to said frame, a screen arranged parallel with said front, means for giving to said screen a reciprocating movement in its own plane, and means for causing said front to approach said screen.

2. In a fertilizer distributer, the combination of a frame, a front movable with respect to said frame, a screen arranged parallel with said front, means for giving to said screen a reciprocating movement in its own plane, means for causing said front to approach said screen and controlling means for regulating the speed of the movement of said front toward said screen and the reciprocating movement of said screen.

3. In a fertilizer distributer, the combination of the frame, a body having sides and front rigidly secured to each other but movable with respect to said frame, a screen arranged parallel with said front between said sides, means for giving to said screen a reciprocating movement in its own plane and means for causing said sides and front to move backward.

4. In a fertilizer distributer, the combination, of a frame and a bottom or floor stationary with respect to each other, sides supported on said frame, braces secured on said frame, a screen arranged between said sides and guided by said braces and the rear end of said floor, yielding means for holding the lower part of said screen against the end of said floor and means for giving to said screen a reciprocating movement in its own plane.

5. In a fertilizer distributer, the combination of a frame and a floor, sides and a front secured to each other and adapted to travel on said frame, racks secured to said sides, the driving axle, supporting wheels on said axle and rotating said axle during the forward movement of said distributer, pinions engaging said rack, means driven by said axle for rotating said pinions to move said sides and front backward.

6. In a fertilizer distributer, the combination of the body, a screen, means for reciprocating the same, a collecting board to receive the fertilizer discharged by said screen, and spouts arranged in said board, to deliver said fertilizer in rows or drills.

7. In a fertilizer distributer, the combination of the body, a screen, means for reciprocating the same, a collecting board to receive the fertilizer discharged by said screen, spouts arranged in said board to deliver said fertilizer in rows or drills, and clearers and means for causing said clearers to travel over said collecting board to sweep said fertilizer into said spouts.

8. In a fertilizer distributer, the combination of the body, a screen, means for reciprocating the same, a collecting board to receive the fertilizer discharged by said screen, spouts arranged in said board to deliver said fertilizer in rows or drills, suitable ways, a slide, having openings at the same intervals with said spouts and means for reciprocating said slide, to deposit said fertilizer at intervals or in hills.

9. In a fertilizer distributer, the combination of the body, a screen, means for reciprocating the same, a collecting board to receive the fertilizer discharged by said screen, spouts arranged in said board to deliver said fertilizer in rows or drills, suitable ways, a slide having openings at the same intervals with said spouts, a lever pivoted on said collecting board and connected to said slide, a pawl, jointed to said lever, a lantern wheel having rundles engaged by said pawl, said pawl having a free end adapted to project over and to be lifted by a rundle following the rundle with which said pawl is engaged, a spring to restore said lever to position, and means for rotating said lantern-wheel.

10. In a fertilizer distributer, the combination of the body, a screen, means for reciprocating the same, a collecting board to receive the fertilizer discharged by said screen, spouts arranged in said board to deliver said fertilizer in rows or drills, suitable ways, a slide having openings at the same intervals with said spouts, a lever pivoted on said collecting board and connected to said slide, a pawl, jointed to said lever, a lantern-wheel having rundles engaged by said pawl, said pawl having a free end adapted to project over and to be lifted by the head of said lantern-wheel, a spring to restore said lever to position and means for rotating said lantern-wheel, said collecting board with said spouts, slide, lever and pawl supported by said board, being detachable from said fertilizer distributer to sow fertilizer broadcast.

11. In a fertilizer distributer, the combination of a driving axle, supporting wheels on said axle, connecting means between each of said wheels and said axle whereby the forward movement of a wheel will rotate said axle, a relatively stationary frame and floor, a front and sides movable on said frame and floor longitudinally of said frame, racks secured to said sides parallel with said floor, and gearing including a pawl and ratchet connecting said rack and said axle to give an intermittent backward movement to said front and sides by the forward movement of said distributer.

12. In a fertilizer distributer, the combination of a driving axle, supporting wheels on said axle, connecting means between each of said wheels and said axle whereby the forward movement of a wheel will rotate said axle, a relatively stationary frame and floor, a front and side movable on said frame and floor longitudinally of said frame, racks secured to said sides parallel with said floor, gearing including a pawl and ratchet connecting said racks and said axle to give an intermittent backward movement to said front and sides by the forward movement of said distributer, said gearing also including a clutch on said driving axle, clutch opening levers and a projection secured on one of said sides adapted to operate said levers to open said clutch to stop the backward movement of said front and sides.

13. In a fertilizer distributer, the combination of a driving axle, supporting wheels on said axle, connecting means between each of said wheels and said axle whereby the forward movement of a wheel will rotate said axle, a relatively stationary frame and floor, a front and side movable on said frame and floor longitudinally of said frame, racks secured to said sides parallel with said floor, gearing including a pawl and ratchet connecting said rack and said axle to give an intermittent backward movement to said front and sides by the forward movement of said distributer, a shield and means for interposing said shield between said pawl and ratchet, to limit or to prevent, at will, the engagement of said pawl and ratchet, to regulate or stop the backward movement of said front and sides.

14. In a fertilizer distributer, the combination of a driving axle, supporting wheels on said axle, connecting means between each of said wheels and said axle whereby the forward movement of a wheel will rotate said axle, a relatively stationary frame and floor, a front and sides movable on said frame and floor longitudinally of said frame, racks secured to said sides parallel with said floor, gearing including a pawl and ratchet connecting said rack and said axle to give an intermittent backward movement to said front and sides by the forward movement of said distributer, a shield, a manually operated lever and a rod connecting said lever and shield, to interpose said shield between said pawl and ratchet, to limit or to prevent, at will, the engagement of said pawl and ratchet, to regulate or stop the backward movement of said front and sides.

15. In a fertilizer distributer, the combination of a driving axle, supporting wheels on said axle, connecting means between each of said wheels and said axle whereby the forward movement of a wheel will rotate said axle, a relatively stationary frame and floor, a front and sides movable on said frame and floor longitudinally of said frame, racks secured to said sides parallel with said floor, pinions in constant engagement with said racks, a slide, gearing driven by said axle and means for moving said slide to bring said pinions in train with said gearing to cause a forward movement of said front and side.

16. In a fertilizer distributer, the combination of a driving axle, supporting wheels on said axle, connecting means between each of said wheels and said axle whereby the forward movement of a wheel will rotate said axle, a relatively stationary frame and floor, a front and sides movable on said frame and floor longitudinally of said frame, racks secured to said sides parallel with said floor, pinions in constant engagement with said racks, a slide on which said pinions are mounted, a lever pivoted on said frame, connecting means between said lever and said slide, gearing driven by said axle and a projection secured on one of said sides and adapted to operate said lever to throw said pinions out of engagement with said gearing.

17. In a fertilizer distributer, the combination of a driving axle, supporting wheels on said axle, connecting means between each of said wheels and said axle whereby the forward movement of a wheel will rotate said axle, a relatively stationary frame and floor, a front and side movable on said frame and floor longitudinally of said frame, racks secured to said sides parallel with said floor, pinions in constant engagement with said racks, a slide on which said pinions mounted, a lever pivoted on said frame, connecting means between said lever and said slide, gearing driven by said axle, a manually operated lever having a projection adapted to move said first named lever to bring said pinions in train with said gearing.

In witness whereof, I have affixed my signature in presence of two witnesses.

CHARLIE L. BURTON.

Witnesses:
  ALBERT M. MOORE,
  LUDGER A. NICOL.

Copies of this patent may be obtained for five cents each, by addressing the "Commissioner of Patents, Washington, D. C."